(12) United States Patent  
Agata

(10) Patent No.: US 8,138,935 B2
(45) Date of Patent: Mar. 20, 2012

(54) IMAGE PROCESSOR

(75) Inventor: Toshinori Agata, Tokyo (JP)

(73) Assignee: Oki Data Corporation, Tokyo (JP)

( * ) Notice: Subject to any disclaimer, the term of this patent is extended or adjusted under 35 U.S.C. 154(b) by 394 days.

(21) Appl. No.: 12/558,694

(22) Filed: Sep. 14, 2009

(65) Prior Publication Data
US 2010/0079300 A1 Apr. 1, 2010

(30) Foreign Application Priority Data
Sep. 30, 2008 (JP) ................................ 2008-253350

(51) Int. Cl.
G08B 21/00 (2006.01)
(52) U.S. Cl. ........................................................ 340/635
(58) Field of Classification Search .................. 340/635, 340/500, 523, 527, 691.6, 661; 358/1.1, 358/448
See application file for complete search history.

(56) References Cited

U.S. PATENT DOCUMENTS

| | | | | | |
|---|---|---|---|---|---|
| 5,699,493 | A | * | 12/1997 | Davidson et al. | 358/1.15 |
| 5,717,384 | A | * | 2/1998 | Johnson et al. | 340/660 |
| 7,006,249 | B2 | * | 2/2006 | Matsuda | 358/1.9 |
| 7,584,242 | B2 | * | 9/2009 | Ebuchi | 709/203 |
| 2004/0252329 | A1 | * | 12/2004 | Sorenson | 358/1.15 |
| 2005/0270552 | A1 | * | 12/2005 | Sakamoto | 358/1.13 |
| 2006/0044572 | A1 | * | 3/2006 | Nakayama | 358/1.1 |

FOREIGN PATENT DOCUMENTS

| JP | H09-222968 A | 8/1997 |
|---|---|---|
| JP | 2000-293344 A | 10/2000 |
| JP | 2004-206684 A | 7/2004 |
| JP | 2006-007516 A | 1/2006 |
| JP | 2006-252459 A | 9/2006 |

* cited by examiner

Primary Examiner — Phung Nguyen
(74) Attorney, Agent, or Firm — Marvin A. Motsenbocker; Mots Law, PLLC

(57) ABSTRACT

An image processor includes: a notification control unit configured, when apparatus condition information which requires an alert is received, to notify alert information corresponding to the alert using a notification unit; a storage unit configured to store first information related to alert information previously notified using the notification unit and second information related to current apparatus condition received which requires an alert; and a judgment unit configured to judge whether the first information and the second information match. The notification control unit is configured to not notify an alert information related to the current apparatus condition which requires an alert using the notification unit when an elapsed time from the notification of the previous alert information to the reception of the current apparatus condition information is equal to or less than a predetermined time period and the first information and the second information match.

8 Claims, 12 Drawing Sheets

FIG. 6

| PRINTER CONDITION CONTENT | PRINTER CONDITION CODE |
|---|---|
| STANDBY | 10001 |
| TONER LEVEL IS LOW | 10002 |
| PAPER OUT | 10003 |
| ...... | ...... |
| ...... | ...... |

FIG. 7

| PRINTER CONDITION CODE | CONDITION TYPE INFORMATION |
|---|---|
| 10001 | NORMAL |
| 10001 | ARLARM |
| 10001 | ERROR |
| ...... | ...... |
| ...... | ...... |

| PRINTER CONDITION CODE | ALERT INFORMATION DISPLAY CHARACTER STRING |
|---|---|
| 10001 | - |
| 10002 | TONER LEVEL IS LOW |
| 10003 | ADD PAPER |
| ...... | ...... |
| ...... | ...... |

IMAGE PROCESSOR

CROSS REFERENCE TO RELATED APPLICATIONS

This application claims priority based on 35 USC 119 from prior Japanese Patent Application No. P2008-253350 filed on Sep. 30, 2008, entitled "Image Processor", the entire contents of which are incorporated herein by reference.

BACKGROUND OF THE INVENTION

1. Field of the Invention

The present invention relates to an image processor configured to monitor condition of an image forming apparatus and notify the condition using a display or a voice message when the monitored result is an error.

2. Description of Related Art

Conventionally, there has been a system in which an image processor connected to and communicating with an image forming apparatus monitors condition of the image forming apparatus and notifies the condition when an error is detected. In such a system, an "error condition" of the image forming apparatus is notified to a user by displaying a dialog box on the image processor or sending a voice message via a speaker (for example, Japanese Patent Application Laid-Open No. 2000-293344).

In this system, the image forming apparatus sends its condition information to the image processor every time a print job is sent from the information processor to the image forming apparatus, and the image processor notifies the user of the state of the "error condition" by, for example, displaying a dialog box whenever the received condition is not a "normal condition" but an "error condition." Thus, as long as the image forming apparatus remains in the same "error condition," a dialog box indicating the same "error condition" is displayed on the display of the image processor or the same "error condition" is announced through the speaker every time a print job is sent. In the image processor, every time the dialog box is displayed, the user is required to end the dialog box display by inputting a confirmation of the error condition or the user's operation is interrupted by each announcement so that there had been insufficient usability of the image processor.

SUMMARY OF THE INVENTION

An aspect of the present invention is an image processor operable to be connected with an image forming apparatus. The image processor includes: an apparatus condition information acquisition unit configured to receive apparatus condition information from the image forming apparatus when the image processor instructs the image forming apparatus to print; a notification control unit configured, when the apparatus condition information acquisition unit receives apparatus condition information which requires an alert, to notify alert information corresponding to the alert using a notification unit; a time period storage unit storing a time period; a storage unit configured to store first information related to alert information previously notified using the notification unit and second information related to current apparatus condition received which requires an alert; and a judgment unit configured to judge whether the first information and the second information match. The notification control unit is configured to not notify alert information related to the current apparatus condition which requires an alert using the notification unit when an elapsed time from the notification of the previous alert information to the reception of the current apparatus condition information which requires an alert is equal to or less than the time period stored in the time period storage unit and the first information and the second information match.

Another aspect of the present invention is an image processor operable to be connected with an image forming apparatus. The image processor includes: an apparatus condition information acquisition unit configured to receive apparatus condition information from the image forming apparatus when the image processor instructs the image forming apparatus to print; a notification control unit configured, when the apparatus condition information acquisition unit receives apparatus condition information which requires an alert, to notify alert information corresponding to the alert using a notification unit; a time period storage unit storing a time period; a storage unit configured to store first information related to alert information previously notified using the notification unit and second information related to current apparatus condition received which requires an alert; and a judgment unit configured to judge whether the first information and the second information match. The notification control unit is configured to notify alert information related to the current apparatus condition which requires an alert using the notification unit when an elapsed time from the notification of the previous alert information to the reception of the current apparatus condition information which requires an alert is greater than the time period stored in the time period storage unit or when the first information and the second information do not match.

According to the aspects of the present invention, an alert notification is executed only when a predetermined period of time is elapsed and when a different "error condition" is detected. Therefore, the frequency of alert notifications is reduced and this improves usability of the image processor.

BRIEF DESCRIPTION OF THE DRAWINGS

FIG. 6 is a diagram explaining printer condition codes stored by a printer and to be stored in a storage unit, wherein each printer condition code corresponds to each printer condition.

FIG. 7 is a correspondence table between printer condition codes stored in a printer condition type storage unit and condition type information.

DETAILED DESCRIPTION OF EMBODIMENTS

Figure 1:
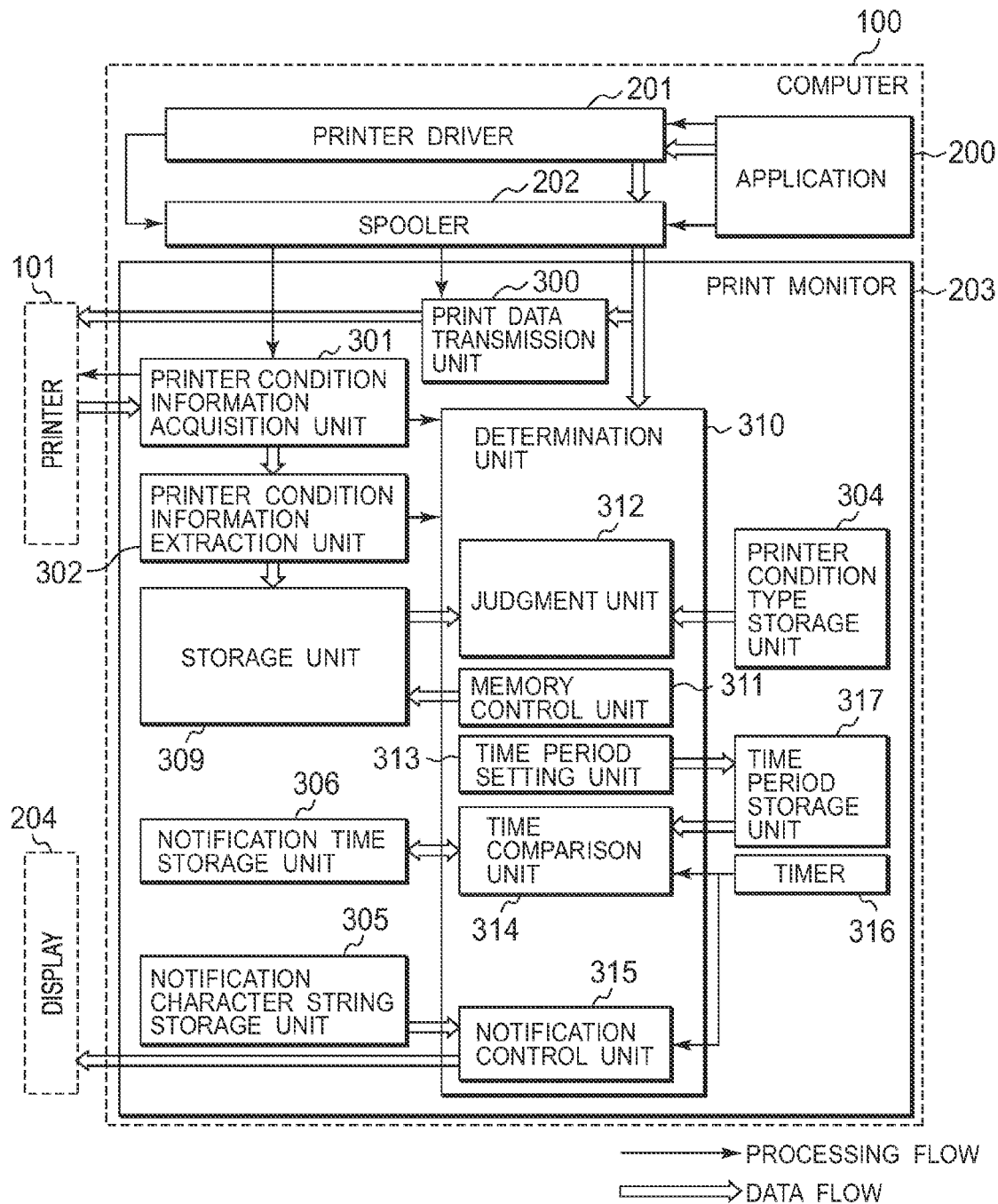
FIG. 1 is a functional block diagram of a print monitor of a computer according to a first embodiment.

Descriptions are provided hereinbelow for embodiments based on the drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

Figure 2:
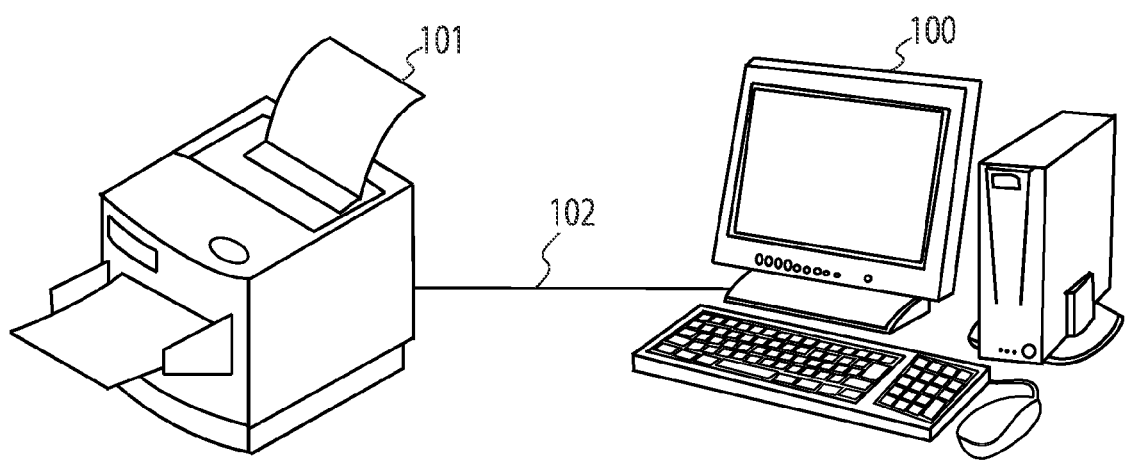
FIG. 2 is a block diagram of a print processing system to which the present invention can be applied.

FIG. 2 is a block diagram of a print processing system to which the present invention can be applied. As shown in FIG. 2, the print processing system has a configuration in which computer 100 serving as an image processor for executing various programs and printer 101 serving as an image forming apparatus are connected via bidirectional cable 102.

Bidirectional cable 102 connecting computer 100 and printer 101 is a USB (Universal Serial Bus) for example.

(First Embodiment)

According to a first embodiment, once computer 100 acquires "error condition" information from the printer 101 and sends an alert to a user, computer 100 does not send another alert during a predetermined time period even when "error condition" information is acquired again if content of the condition is the same. This configuration solves the problem that "error condition" is repeatedly notified and the usability of computer 100 is insufficient. An outline of the invention will be described prior to the structure of the first embodiment.

Figure 3:
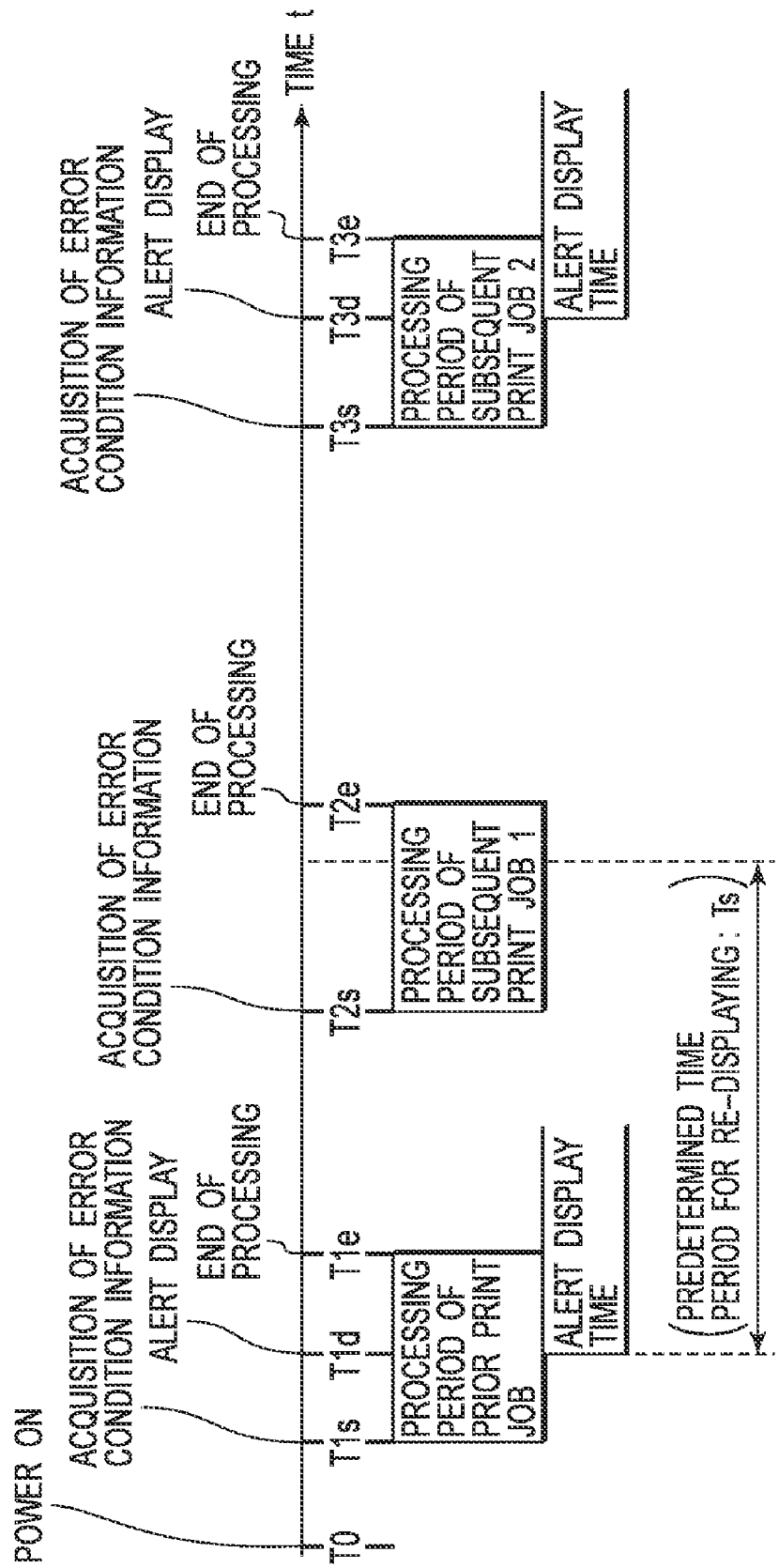
FIG. 3 is a timing chart (1) of an outline operation according to the first embodiment.

First a case where the same "error condition" information is repeatedly acquired will be described. FIG. 3 is a timing chart (1) of an outline operation of the first embodiment. FIG. 3 shows the time elapsed after computer 100 is turned on and the printer conditions at respective times. In this assumption, as an example, it is assumed that power is applied to computer 100 at Time T0 and print job processes start at Times T1s, T2s and T3s. In this structure, computer 100 (FIG. 3) operates as follows.

As shown in FIG. 3, power is applied to computer 100 at Time T0, computer 100 acquires first "error condition" information of prior (preceding) print job process start timing at Time T1s. After a short time period, an alert notification is executed at Time T1d. The prior print job ends at Time T1e. Then, a process of subsequent (following) print job 1 starts at Time T2s. When the "error condition" remains at this time, computer 100 acquires "error condition" information.

According to the first embodiment, elapsed time Tx from the execution of the alert notification T1d to the present time (Time T2s) is calculated. When calculated elapsed time Tx does not exceed predetermined time period Ts for re-notification, the alert notification is not executed. According to FIG. 3, since Time T2s for starting the processing of subsequent print job 1 is before the end of predetermined time period Ts for the re-notification, the alert notification is not executed and print job 1 ends at Time T2e.

Then, processing of subsequent print job 2 starts at Time T3s. When the "error condition" remains at this time, computer 100 acquires "error condition" information. Since the time (Time T3s) is after the end of predetermined time period Ts, an alert notification is executed at Time T3d and the processing of print job 2 ends at Time T3e. As a result, a notification of the "error condition" is not executed during the processing of print job 1.

Figure 4:
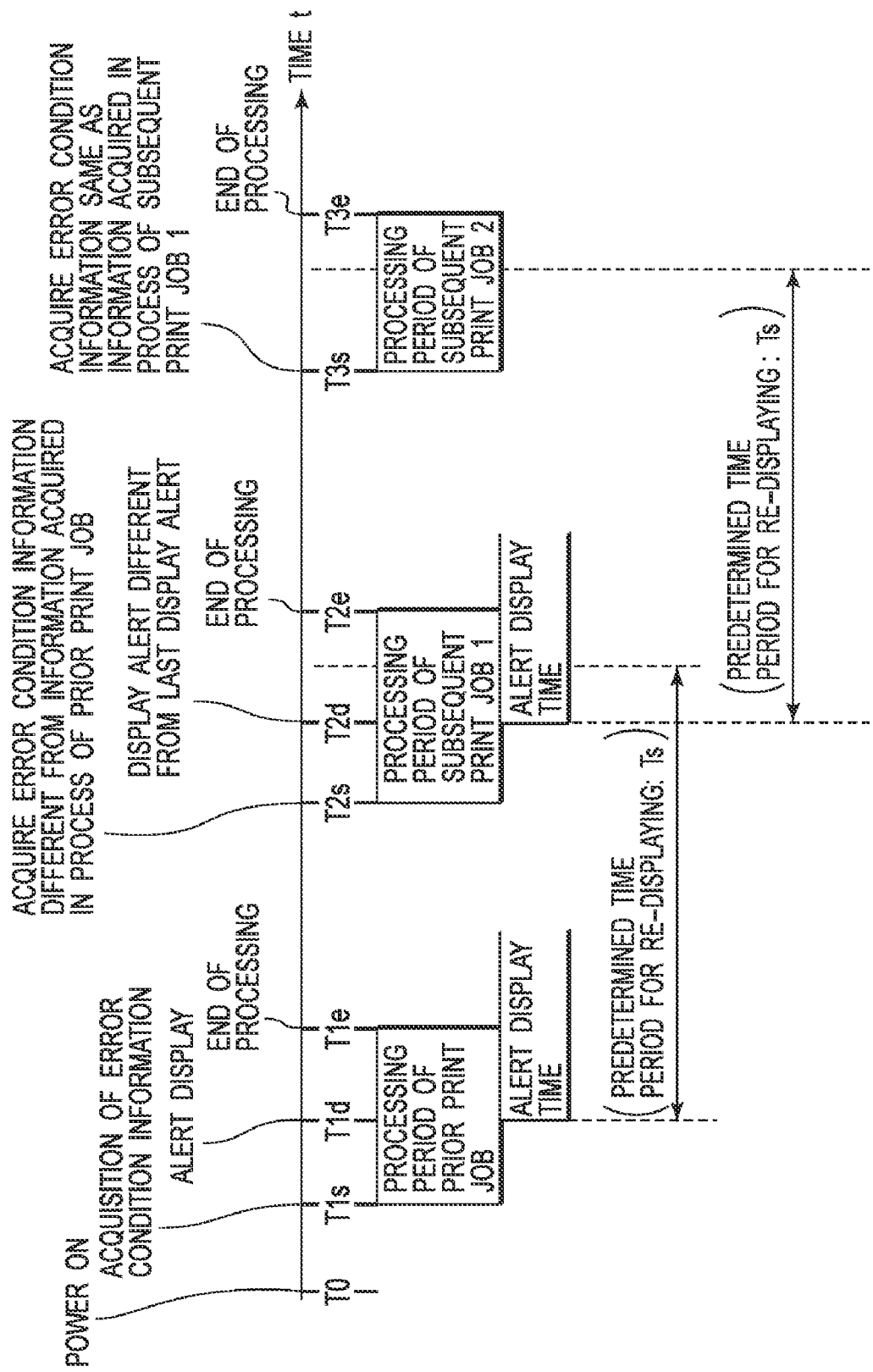
FIG. 4 is a timing chart (2) of the outline operation according to the first embodiment.

Secondly, a case where different "error condition" information is acquired will be explained. FIG. 4 is a timing chart (2) showing an outline operation of the first embodiment. FIG. 4 shows the time elapsed after power is applied to computer 100 and printer conditions at respective times. In this case, as an example, it is assumed that computer 100 is turned on at Time T0 and print job processes start at Times T1s, T2s and T3s. In this assumption, computer 100 (FIG. 4) operates as follows.

As shown in FIG. 4, power is applied to computer 100 at Time T0 and computer 100 acquires first "error condition" information at Time T1s of prior print job processing start time. After a short time period, an alert notification is executed at Time T1d. The processing of the prior print job ends at Time T1e. Then, processing of a subsequent print job 1 starts at Time T2s. At this time, if printer 101 is in an "error condition" different from the condition of the prior print job start time, computer 100 acquires "error condition" information different from that of the prior print job start time from printer 101.

According to the first embodiment, elapsed time Tx from alert notification execution time T1d to the present time (Time T2s) is first calculated. When calculated elapsed time Tx does not exceed predetermined time period Ts for re-notification, the alert notification is not executed; however, as shown in FIG. 4, the "error condition" information (second information) acquired at the subsequent print job 1 process start time is different from the "error condition" information (first information) acquired at the prior print job process start time Time T1s, so a different alert notification is executed at Time T2d after a short period of time. The processing of subsequent print job 1 ends at Time T2e.

Then, processing of subsequent print job 2 starts at Time T3s. At this time, when the "error condition" the same as the "error condition" acquired during subsequent print job 1 remains, computer 100 receives the "error condition" information. Since the time (Time T3s) is before the end of the predetermined time period Ts which starts at Time T2d, the alert notification is not executed and the processing of print job 2 ends at Time T3e. As a result, the "error condition" is not notified during the processing of print job 2.

As described the above, the number of "error condition" notifications are controlled and this reduces the number of user confirmation input operations and the usability of computer 100 improves.

(Description of Configuration of First Embodiment)

Figure 5:
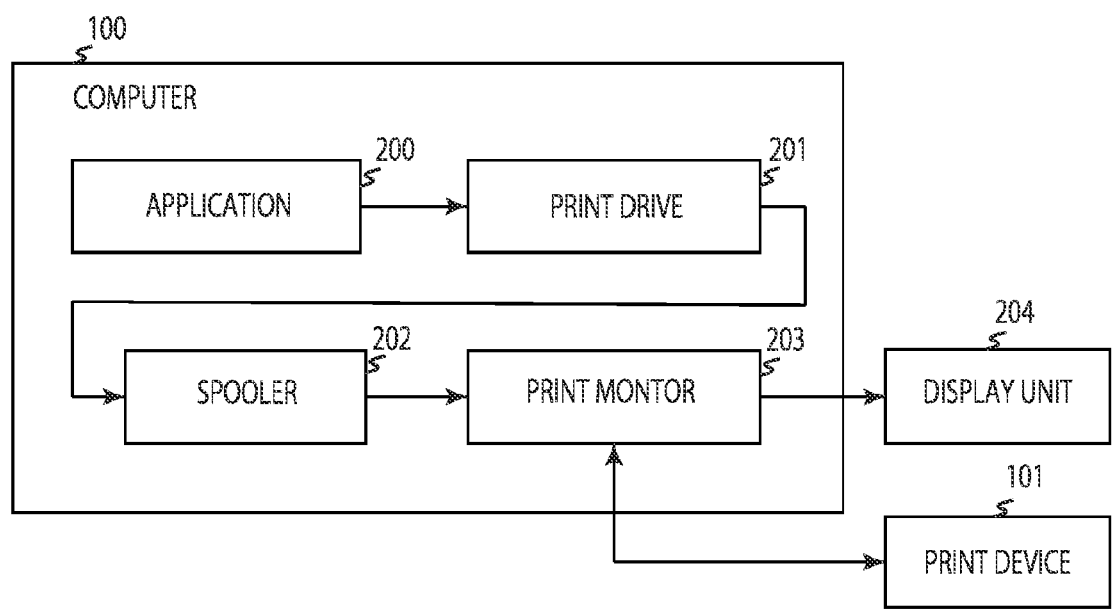
FIG. 5 is a block diagram of a printing system according to an embodiment.

FIG. 5 is a block diagram of a printing system according to the first embodiment. According to the present embodiment, a notification method will be explained as a display on a screen display, not as a voice message from a speaker. As shown in FIG. 5, computer 100 as an image processor includes application 200, printer driver 201, spooler 202, print monitor 203 and display 204.

Application 200 has a function for inputting text data, graphic data and the like and combining those data to create document information, image information and the like.

Printer driver 201 has a function for converting the document information and/or image information created by application 200 into print data applicable to printer 101.

Spooler 202 has a function for managing the print data output from printer driver 201 as a print job. In other words, spooler 202 adds a print job to a print queue and sends a print job start notification, print data and a print job end notification to print monitor 203 according to queue priorities.

Print monitor 203 judges an alert level of the printer condition, the latest notified printer condition and time of the latest notified printer condition and notifies character string information corresponding to the printer condition to display 204 of computer 100.

The respective components will be described in detail. FIG. 1 is a functional block diagram of print monitor 203 of computer 100 according to the first embodiment.

Print data transmission unit 300 is a unit to receive print data from spooler 202 and output the print data to printer 101 and stops outputting the data when receiving a print job end notification.

Upon receiving a print job start notification from spooler 202, printer condition information acquisition unit 301 sends a command for acquiring a printer condition to printer 101, acquires printer condition information generated by printer 101 in response to the command, and transfers the acquired printer condition information to printer condition information extraction unit 302. Here, the printer condition information represents information as a broader concept including operation condition information and consumable supply information regarding the printer.

Printer condition information extraction unit 302 extracts a code indicating a condition of printer 101 from the transferred printer condition information and stores the code to storage unit 309 as second information.

Storage unit 309 stores the second information of the code indicating the condition of printer 101 and outputs the code in response to a request from determination unit 310. Storage unit 309 stores a code for a display character string of the latest alert displayed on display 204 as first information and outputs the code in response to a request form determination unit 310.

FIG. 6 is a table showing printer condition contents indicated by the codes stored by printer 101 and to be stored in storage unit 309 as second information. The 5-digit code "10001" indicates "standby" condition, "10002" indicates "toner low" condition and "10003" indicates "paper-out" condition.

Printer condition type storage unit 304 stores condition type information associated with the respective codes and outputs the condition type information to determination unit 310 in response to a request of determination unit 310. FIG. 7 shows condition type information stored in printer condition type storage unit 304. The 5-digit code "10001" is associated with "normal," "10002" is associated with "alert" and "10003" is associated with "error" as condition type information.

Figures 8, 9:
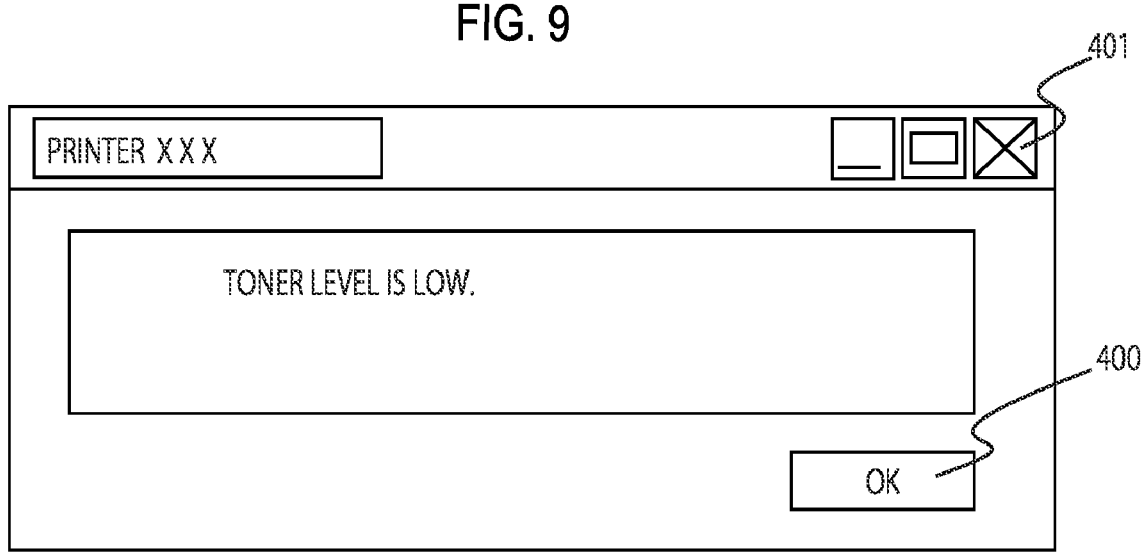
FIG. 8 is a correspondence table between printer condition codes stored in a notification character string storage unit and alert information notification character strings to notify an alert on a display of the computer.
FIG. 9 is a diagram of an example of a dialog box notifying a notification character string.

Notification character string storage unit 305 stores alert information notification character strings that are notification character strings which are to be displayed on display 204 of computer 100 according to the 5-digit code associated with the printer condition and outputs the alert information notification character string to determination unit 310 in response to a request from determination unit 310. FIG. 8 is a diagram showing a correspondence relation between the codes stored in notification character string storage unit 305 and the notification character strings to alert on display 204 of computer 100. Code of "10002" is associated with "Toner level is low," "10003" is associated with "Add paper."

Notification time storage unit 306 stores the time when an "alert" notification character string was displayed on display 204 of computer 100.

Determination unit 310 has various determination functions and mainly includes memory control unit 311, judgment unit 312, time period setting unit 313, time comparison unit 314 and notification control unit 315.

Memory control unit 311 has a function for storing, in storage unit 309, the code of the alert display character string displayed on display 204 as first information.

Judgment unit 312 refers to the printer condition codes (FIG. 6) stored in storage unit 309 and acquires printer condition type information (FIG. 7) corresponding to the code of printer condition type storage unit 304 as second information. Judgment unit 312 judges the condition type among "normal," "error" and "alert." In a case of "alert," judgment unit 312 checks the alert code of the previous notification stored in storage unit 309 as first information to judge whether the alert content matches with the previous alert content.

Time period setting unit 313 has a function for registering predetermined time period Ts, which is input by a user using an input unit, to time period storage unit 317.

Time comparison unit 314 calculates elapsed time Tx, which is a difference between the time stored in notification time storage unit 306 and the present time acquired from timer 316 and compares elapsed time Tx and predetermined time period Ts stored in time period storage unit 317.

According to instructions of judgment unit 312 and time comparison unit 314, notification control unit 315 acquires a notification character string (FIG. 8) corresponding to the alert code indicating alert condition of printer 101 from notification character string storage unit 305 and outputs the alert display character string to display it on display 204 of computer 100. After displaying the alert display character string, notification control unit 315 receives a time signal from timer 316, determines the ending of displaying after an alert notification period (for example 10 seconds; see FIGS. 3, 4 and 11) and ends the "alert" display without waiting for a user's click on a button to close the dialog box display. With this configuration, the user is not required to take an input operation to close the dialog box display.

Timer 316 keeps measuring the present time and supplies the present time to time comparison unit 314 and notification control unit 315.

Time period storage unit 317 stores predetermined time period Ts from the time of the previous "alert" notification to the time of a next "alert" notification. Predetermined time period Ts is a value previously input by the user using the input unit (not shown) and set by time period setting unit 313.

Application 200, printer driver 201, spooler 202 and print monitor 203 are functional units which are activated or generated when a CPU (not shown) executes a predetermined control program previously stored in a ROM or a hard disk (not shown) in computer 100.

(Explanation of Operation of First Embodiment)

Figure 10:
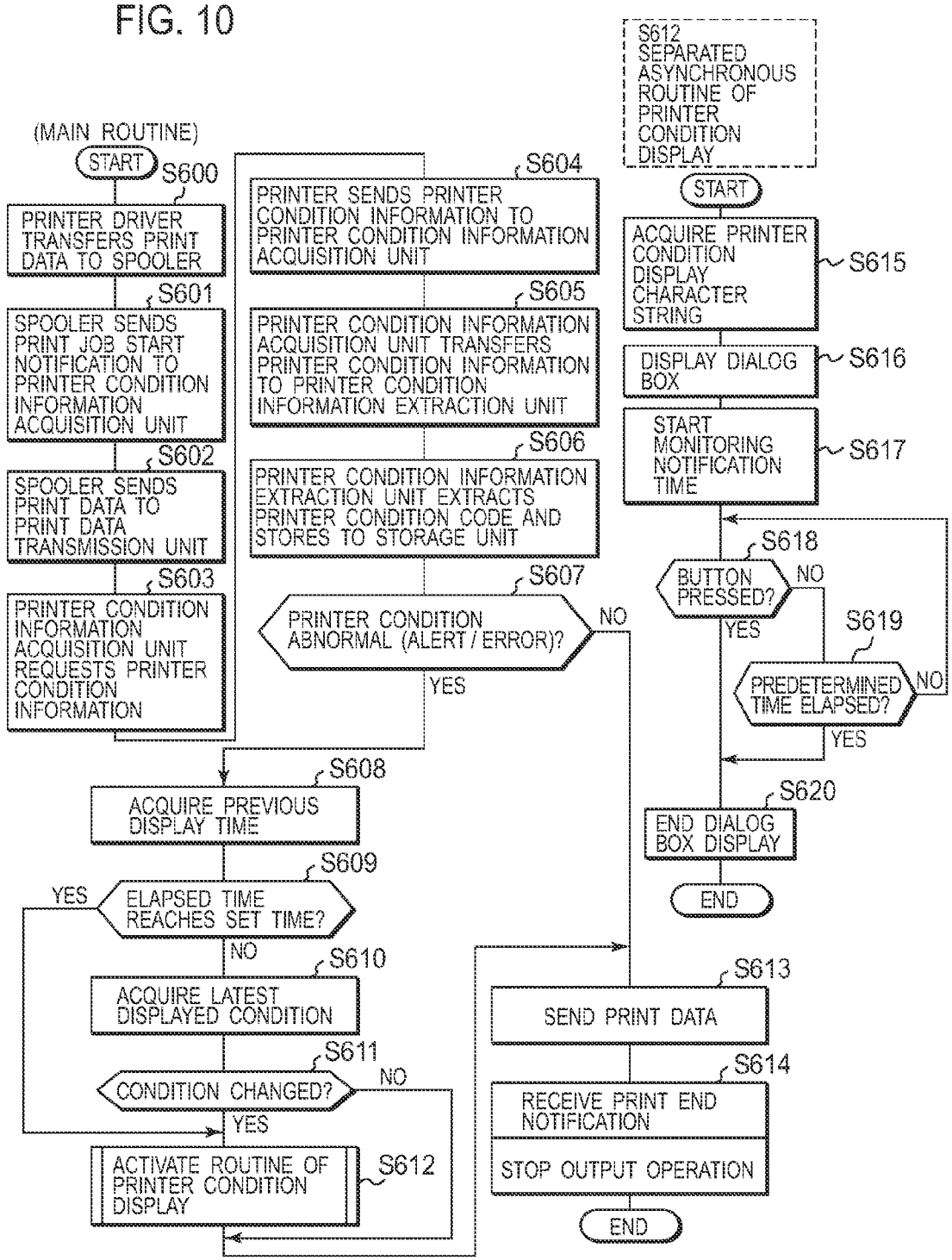
FIG. 10 is a flowchart of an operation of notifying a printer condition according to the first embodiment.

FIG. 10 is a flowchart of an operation to notify a printer condition, which represents a broader concept including a consumable supply condition and operation condition of the printer.

FIG. 9 is a diagram of a dialog box to display a notification character string. FIG. 9 is used in the explanation of the flowchart. The flow of print data will be described from step S600 to step S620 in order with reference to FIGS. 9, 10.

Step S600:

When application 200 requests printing, printer driver 201 sends print data to spooler 202.

Step S601:

Spooler 202 sends a print job start notification to printer condition information acquisition unit 301 in print monitor 203.

Step S602:
Spooler 202 sends the print data to print data transmission unit 300 in print monitor 203.
Step S603:
Upon receiving the print job start notification, printer condition information acquisition unit 301 of print monitor 203 sends a command for acquiring printer condition information to printer 101.
Step S604:
Printer condition information acquisition unit 301 serving as an apparatus condition information acquisition of the monitor 203 acquires printer condition information serving as an apparatus condition information acquisition (FIG. 6) from printer 101.
Step S605:
Printer condition information acquisition unit 301 transfers the printer condition information to printer condition information extraction unit 302.
Step S606:
Printer condition information extraction unit 302 extracts a code (FIG. 6) of the printer condition information and stores the code to storage unit 309 as second information.

Judgment unit 312 in determination unit 310 acquires the code as the second information from storage unit 309.

Judgment unit 312 acquires printer condition type information (FIG. 7) corresponding to the acquired code from printer condition type storage unit 304.
Step S607:
When the printer condition is "10001" for example, judgment unit 312 does not notify the printer condition and the process proceeds to step S613 since the printer condition type information corresponding to the printer condition is "normal." When the corresponding printer condition type information is "alert," the process proceeds to step S608. When the corresponding printer condition type information is "error," the operation stops until paper is added.
Step S608:
Time comparison unit 314 acquires a previous notification time from notification time storage unit 306 and the present time from timer 316.
Step S609:
Time comparison unit 314 calculates elapsed time Tx based on a difference between the previous notification time and the present time and compares elapsed time Tx with predetermined time period Ts stored in time period storage unit 317. Here, as an example, a case where predetermined time period Ts is set as 60 seconds will be described. When the difference between the previous notification time stored in notification time storage unit 306 and the present time excesses 60 seconds, time comparison unit 314 determines that predetermined time period Ts has passed and process proceeds to step S612. When elapsed time Tx is less than 60 seconds, time comparison unit 314 determines that predetermined time period Ts has not passed and the process proceeds to step S610.
Step S610:
Upon receiving a notification from time comparison unit 314 which notifies that elapsed time Tx has not reached predetermined time period Ts, judgment unit 312 acquires an alert code (first information) of the previous notification from storage unit 309.
Step S611:
Judgment unit 312 checks the acquired previous alert code (first information) with the current alert code (second information) also acquired from storage unit 309. When the codes are different, judgment unit 312 judges that the "alert" condition has changed and the process proceeds to step S612 to instruct notification control unit 315 to notify the alert. When the codes are the same, judgment unit 312 judges that the same "alert" condition remains and the process proceeds to step S613 without notifying the alert information of the printer condition.
Step S612:
Time comparison unit 314 or judgment unit 312 instructs notification control unit 315 to notify the alert according to the alert code (second information) stored in storage unit 309. Upon receiving the instruction, it proceeds to step S615 and notification control unit 315 activates a separate asynchronous routine. Memory control unit 311 stores the alert code (second information) instructed by notification control unit 315 to storage unit 309 as first information. The detail of step S612 will be described in the following steps S615 to S620.
Step S615:
Notification control unit 315 acquires a notification character string (FIG. 8) corresponding to the alert code (second information) from notification character string storage unit 305.

When the alert code, which is acquired in judgment unit 312, is "10002" for example, notification control unit 315 acquires the notification character string of "Toner level is low."
Step S616:
Notification control unit 315 displays the notification character string shown in FIG. 9 on display 204 independently from other process operations such as a print data transmission implemented by determination unit 310.
Step S617:
When notification control unit 315 performs the alert notification on display 204, determination unit 310 reads the present time from timer 316 and stores the present time to notification time storage unit 306.
Step S618:
Notification control unit 315 checks whether OK button 400 or close button 401 on a dialog box is clicked and, if one of them is pressed, the process proceeds to step S620. If none of them is pressed, the process proceeds to step S619.
Step S619:
Notification control unit 315 monitors notification time. When a predetermined time passes without a user's click of the one of the buttons, notification control unit 315 ends the display of the dialog box on display 204 and the process proceeds to step S620. When the predetermined time does not pass, the process proceeds to step S618.
Step S620:
Notification control unit 315 ends the alert notification process of the dialog box.
Step S613:
Print data transmission unit 300 outputs the print data to printer 101.
Step S614:
Upon receiving a print job end notification from spooler 202, print data transmission unit 300 stops the output operation.

According to the present embodiment, in order to reduce the frequency of alert notifications, it is judged whether elapsed time Tx from a previous notification time reaches predetermined time period Ts and, when it is not reached, it is checked whether the alert condition is the same as the previous notification content. However, it may first be checked whether the alert condition is the same as the previous condition and then the elapsed time may be judged when it is determined that the conditions are the same.

(Effect of First Embodiment)

Predetermined time period Ts to not execute re-notification of printer alert information is previously set and, when elapsed time Tx that is a time difference between a time of notifying alert during a prior print job and a time of acquiring an error condition information during a subsequent print job does not reach predetermined time period Ts and the printer conditions is the same, the alert information is not notified. With the printer having such a configuration, the number of alert notifications can be reduced. Further, according to the first embodiment, since the "alert" notification ends after an alert notification time without user's click of a button to close the notification of a dialog box, user's troublesome input operations can be reduced.

(Second Embodiment)

A characteristic of a second embodiment is that, once an alert notification is performed during processing of a series of print jobs, computer 500 as an image processor does not perform the same alert notification during the processing of the series of print jobs regardless of whether passing predetermined time period Ts so as to reduce the frequency of alert notifications.

A case where the same "error condition" information is acquired during a processing of a series of print jobs will be described with reference to a timing chart.

Figure 11:
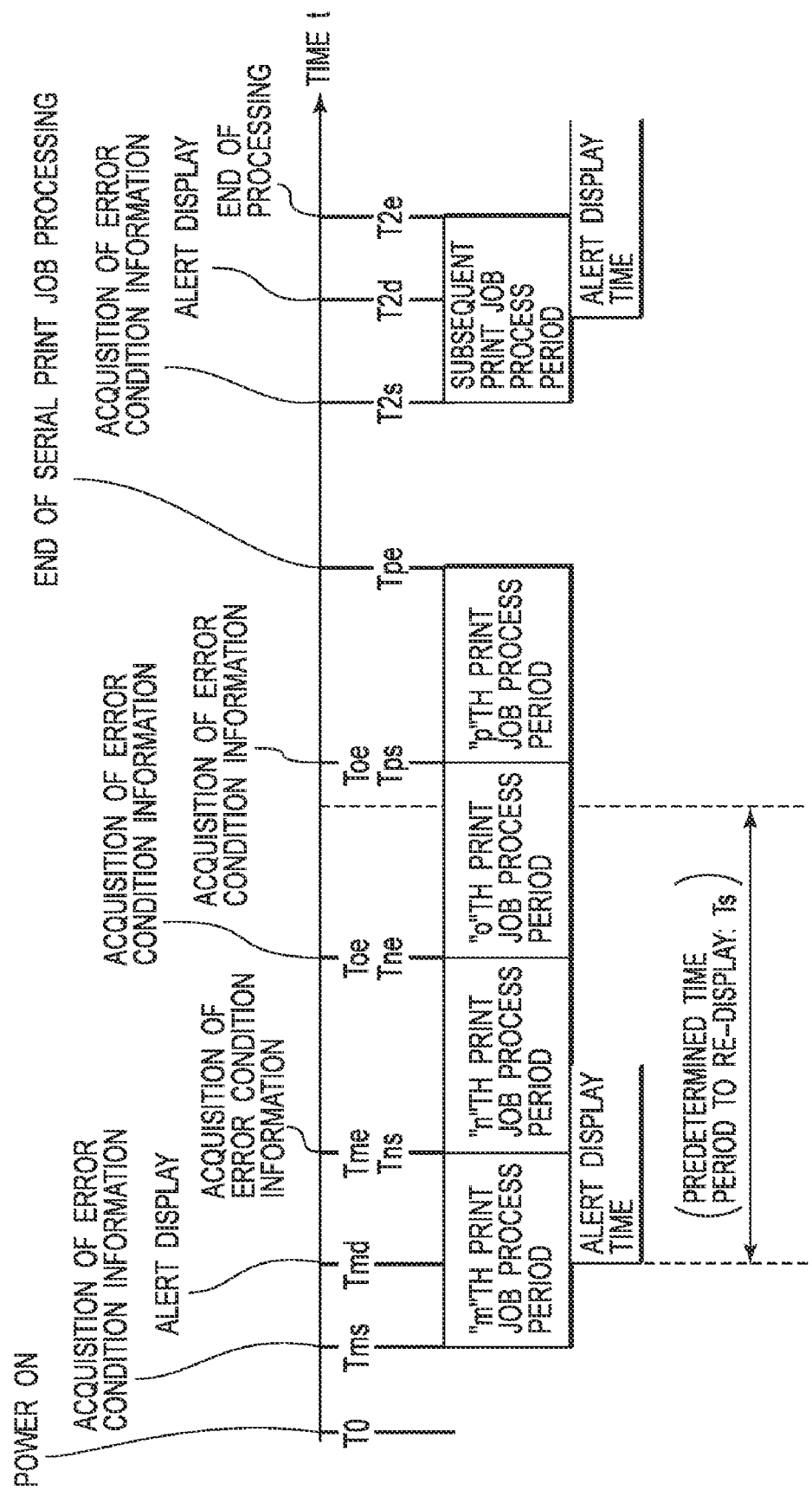
FIG. 11 is a timing chart of an outline operation according to a second embodiment.

FIG. 11 is a timing chart of an outline operation of the second embodiment. FIG. 11 shows an example in which computer 500 is turned on at Time T0, a series of print jobs is processed, and first "error condition" information is acquired during processing of "m"th print job.

As shown in FIG. 11, computer 500 is turned on at Time T0 and computer 500 acquires first "error condition" information at Time Tms of beginning of the "m"th print job.

In this case, an alert notification is performed at Time Tmd.

The "m"th print job ends at Time Tme. At the same time, an "n"th print job starts at Time Tns. When the "error condition" remains at this time, computer 500 acquires "error condition" information.

When the "error condition" information is acquired at Time Tme, computer 500 determines whether the print job is a single print job or serial print job. In case of a serial print job, an alert notification is not executed.

During the serial print job, when the same "error condition" is acquired repeatedly, an alert notification is executed only once (regardless of passing predetermined time period Ts) and the alert notification is not executed more than once and the process of the serial print job ends at Time Tpe.

Then, processing of a subsequent print job starts at Time T2s. When the same "error condition" still remains at this timing, computer 500 acquires "error condition" information and executes the alert notification since the subsequent print job is a single print job (including a lead print job of a serial print job).

As described above, the frequency of "error condition" notifications is reduced, the frequency of user's confirmation input operations is reduced and the usability of computer 500 improves.

(Differences from Configuration of First Embodiment)

Figure 12:
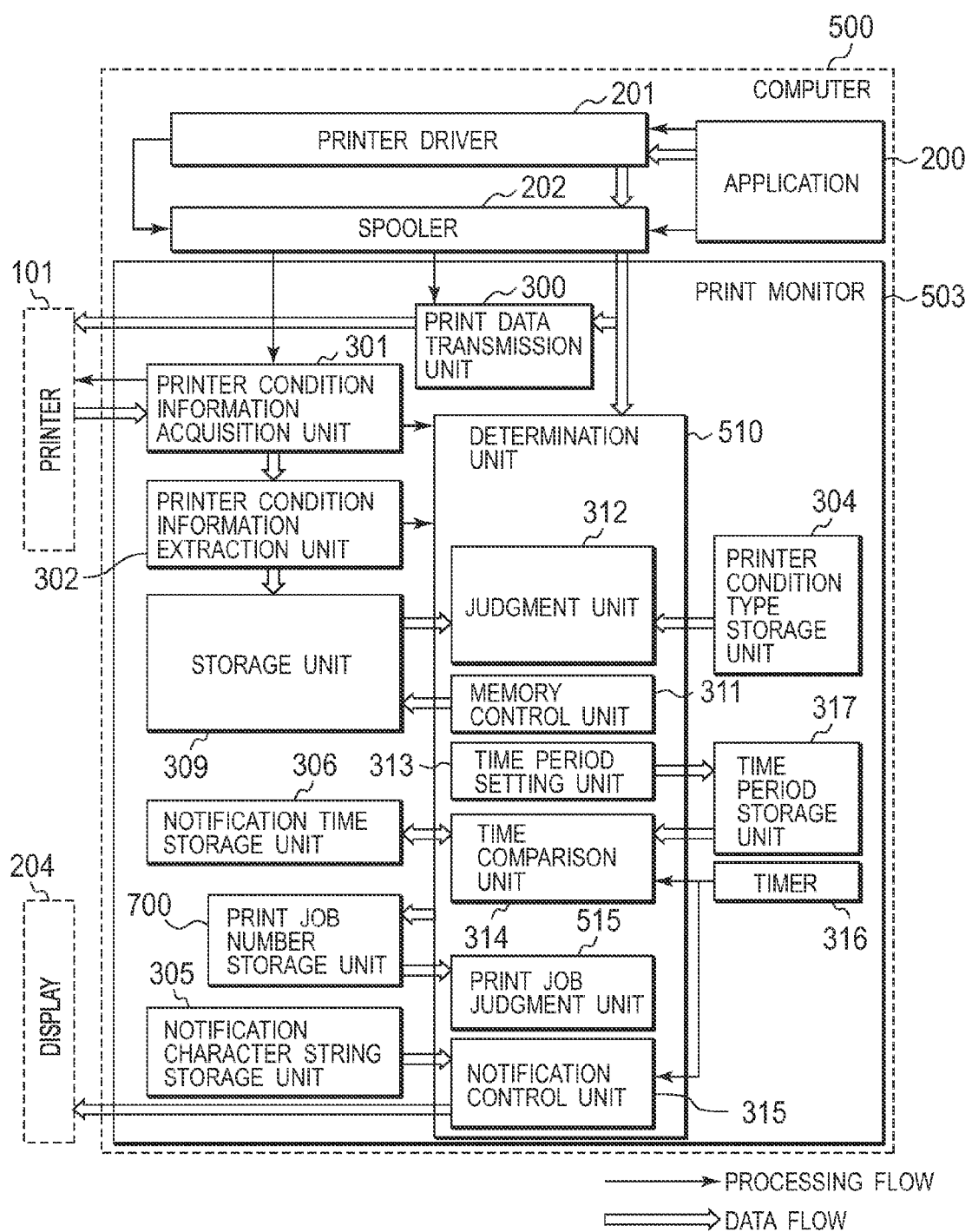
FIG. 12 is a functional block diagram of a print monitor of a computer according to the second embodiment.

FIG. 12 is a functional block diagram of print monitor 503 of computer 500 according to the second embodiment. Difference between the configuration of the second embodiment and that of the first embodiment will be described with reference to FIG. 12.

Here, a serial print job will be defined. At the time when a print job is sent from spooler 202 via print data transmission unit 300 of print monitor 203 to printer 101, if a subsequent print job exists in spooler 202, the prior (preceding) print job and subsequent (following) print job are defined as a serial print job.

Thus, by counting the number of print jobs in spooler 202 when a printer condition code is saved in storage unit 309 (Step S602), judgment unit 312 and/or time comparison unit 514 of determination unit 510 can determine whether the printer condition code corresponds to a printer condition at a time of processing the last print job of the serial print job or not at the time of processing the last print job. In other words, if the number of print jobs in spooler 202 is one or more, there is a subsequent print job continuously following the print job that is currently executed. If the number of print jobs in spooler 202 is zero, there is no subsequent print job continuously following the print job that is currently executed. However, in such a method, judgment unit 312 and/or time comparison unit 514 cannot determine whether the printer condition code indicates a printer condition at a time of processing a subsequent print job of a serial print job or at a time of processing a single print job (including a lead print job of a serial print job).

In this point of view, according to the present embodiment, print job judgment unit 515 and print job number storage unit 700 are further provided in print monitor 503. As a means of determining whether the subsequent print job is of a serial print job, print job judgment unit 515 is provided. Print job judgment unit 515 acquires the number of print jobs in spooler 202 just before step S613 of the first embodiment and registers the acquired value in print job number storage unit 700 and checks the stored value when a following print job is executed. Print job judgment unit 515 determines when the value is zero, the print job is a single print job (including a lead print job of a serial print job) and when the value is one or greater, the print job is of a serial print job ("1" means the last print job of a serial print job).

In print monitor 503 of the second embodiment shown in FIG. 12, print job number storage unit 700 is further provided in print monitor 203 of the first embodiment and print job judgment unit 515 is further provided in determination unit 310, compared to the first embodiment. Print job number storage unit 700 stores the number of print jobs existing in spooler 202.

(Explanation of Operation of Second Embodiment)

Figure 13:
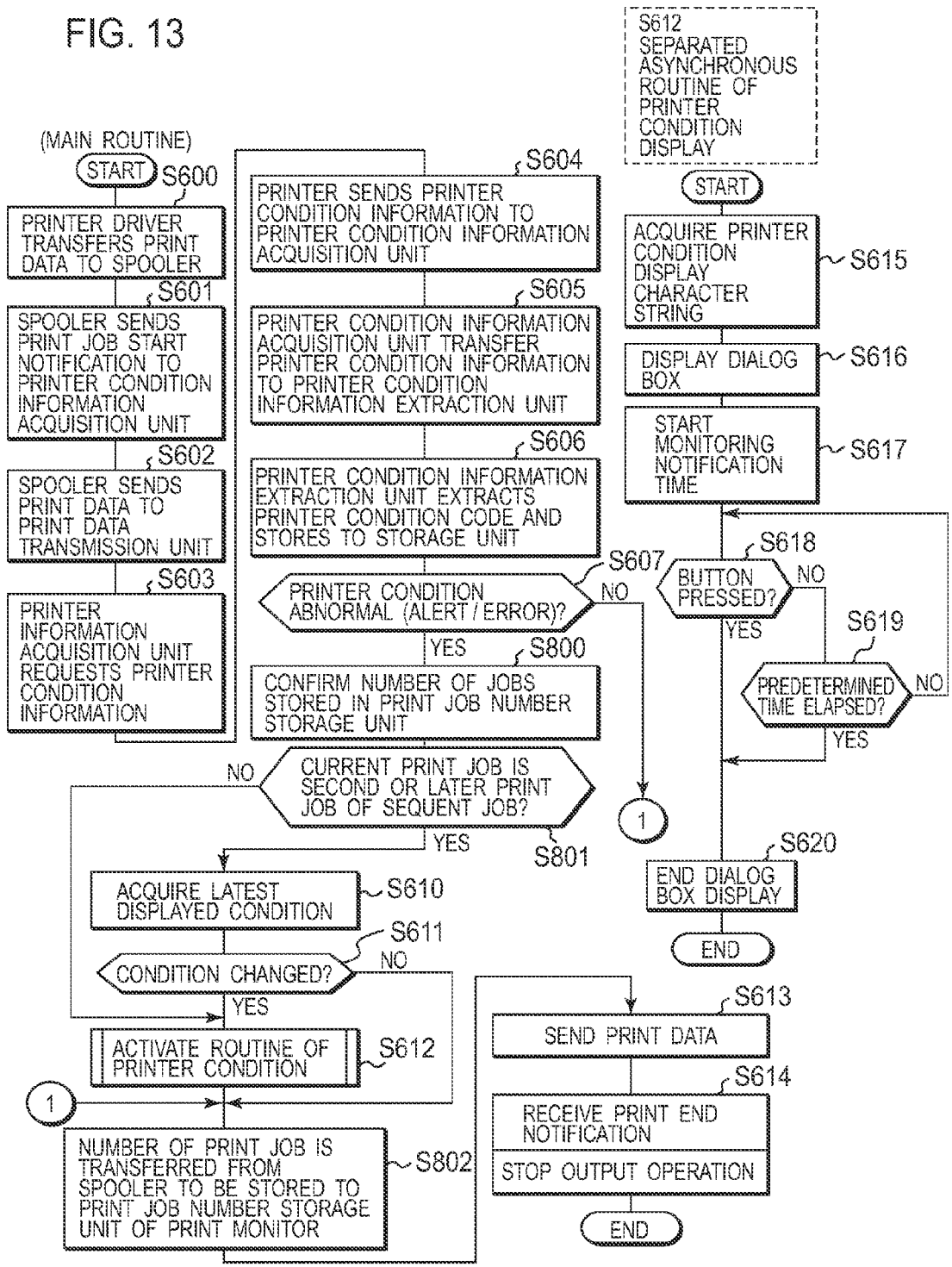
FIG. 13 is a flowchart of an operation of notifying a printer condition according to the second embodiment.

FIG. 13 is a flowchart of an operation of notifying a printer condition according to the second embodiment. Only the operations different from those of the first embodiment will be described with reference to FIG. 13.

Step S800:

After judgment unit 312 determines that the printer type information is "alert," print job judgment unit 515 of determination unit 510 acquires the number of print jobs stored in print job number storage unit 700.

Step S801:

Print job judgment unit 515 checks the number of print jobs stored in print job number storage unit 700. When the number of the print jobs is one or more, the print job that is currently processed is determined as a subsequent print job of a serial print job (the second or later print job of a serial print job) and the process proceeds to step S610. When the number is zero, the job is determined as a single print job (including a lead print job of a serial print job) and the process proceeds to step S612.

Step S802:

After activating a dialog box notification routine starting from step S615, determination unit 510 acquires the number of following print jobs stored in spooler 202 and stores the number to print job number storage unit 700. Then the process proceeds to step S613.

In step S611, when the printer condition code is matched with the previous printer condition code, the process does not proceed to step S612 but to step S802 and judgment unit 312 acquires the number of print jobs stored in spooler 202 and stores the number to print job number storage unit 700. Then, the process proceeds to step S613.

With the above operation, an alert information notification regarding the printer condition is executed for the lead print job of a series of serial print job at a time when the printer is in an "error condition" and the same alert information notification is not executed for the second or later print job of the serial print job.

As described above (the Preferred Embodiment), the print job judgment unit 515 of determination unit 510 determines if the serial print job is being processed based on the number of print jobs existing in spooler 202 serving as a component of computer 500. After executing one alert notification during a series of serial print job, the same "alert condition" is not notified during the serial print job process regardless of predetermined time period Ts for re-notification. This improves the usability of computer 500s.

(Effect of Second Embodiment)

In a case where print jobs are continuously sequentially requested, during the series of serial print jobs, printer alert information is notified only for a first print job in the "error condition" and the printer alert information is not notified for other jobs unless the printer condition changes. This reduces the number of printer alert notifications. After the alert notification, the "alert" notification is ended after a predetermined time even if the user does not click the button to close the dialog box. This reduces a part of troublesome operations of the user and provides an effect the same as that of the first embodiment. With such a structure, since frequent printer alert notifications are not executed and the alert notification end operation is executed by itself, the usability of computer 500 improves.

(Third Embodiment)

According to a third embodiment, in computer 500 serving as an image processor, time comparison unit 514 has a function to compare predetermined time period Ts stored in time period storage unit 317 with elapsed time Tx, which is a time difference between the time acquired from notification time storage unit 306 and the time acquired from timer 316, determine whether elapsed time Tx is greater than predetermined time period Ts and whether the print job is a single print job (including a lead print job of a serial print job) or a subsequent print of a serial print job (which is a second or later print job of a serial print job) according to the number of print jobs existing in the spooler, and instruct the notification control unit to notify the alert information in a case where the print job is determined as a single print job.

(Explanation of Configuration of Third Embodiment)

Since components of the third embodiment are the same as those of the second embodiment, those explanations will be omitted here.

(Explanation of Operation of Third Embodiment)

Figure 14:
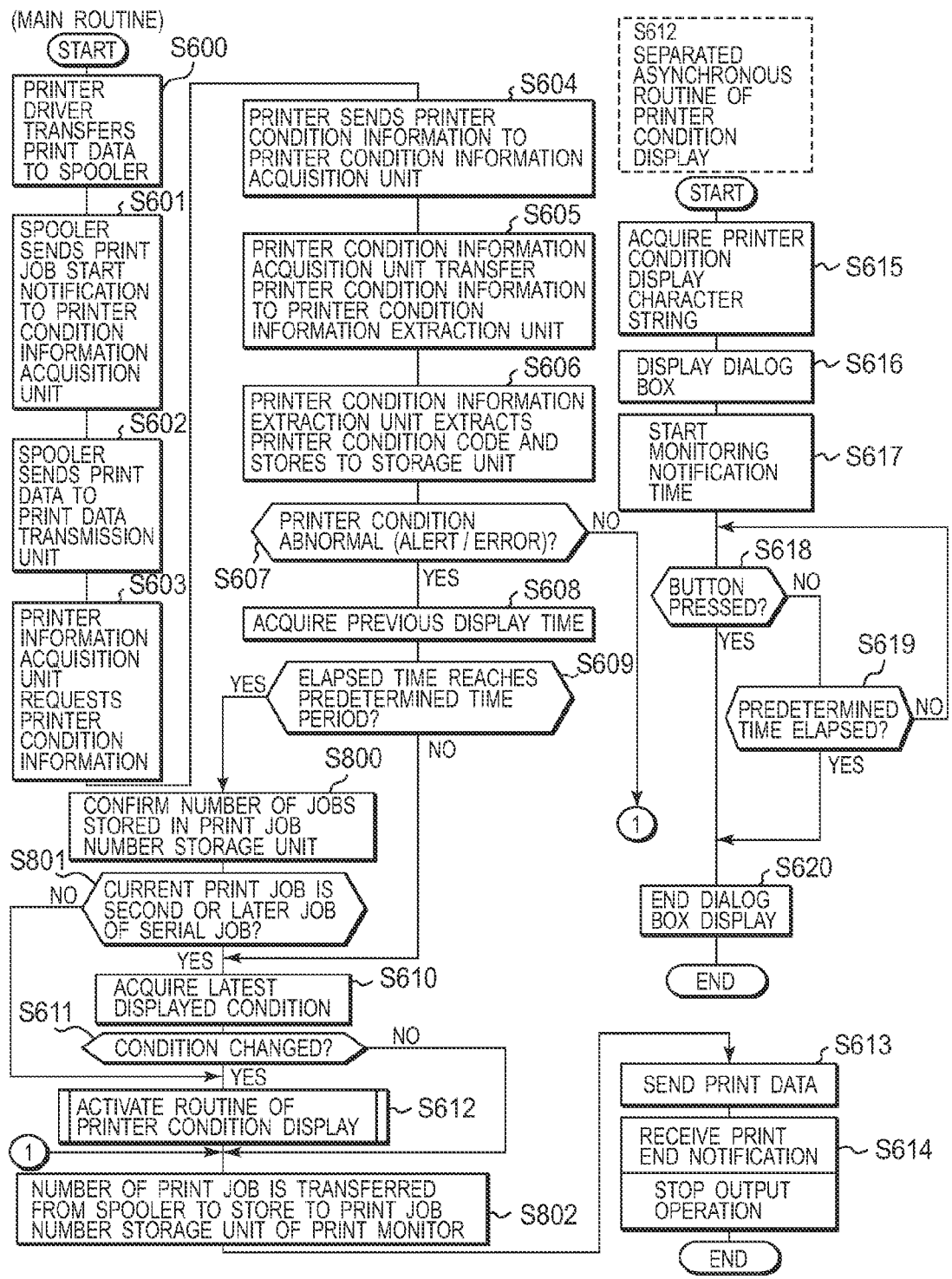
FIG. 14 is a flowchart of an operation of notifying a printer condition according to a third embodiment.

FIG. 14 is a flowchart of an operation for notifying a printer condition according to the third embodiment. Since operation of the third embodiment is a combination of operations of the first and second embodiments, the details are covered by the above embodiments and omitted in the third embodiment.

(Effect of Third Embodiment)

According to the third embodiment, predetermined time period Ts indicating a time period to re-notify the above alert information can be set to be changed and, in addition, in a case of serial print job, the alert notification is executed only once during the processing of the series of serial print job, and the same alert condition is not repeatedly notified during the serial print job. This configuration is more effective to reduce the number of alert notifications by setting relatively long predetermined time periods Ts between single print jobs and between a serial print job and a single print job in a state where single print jobs and serial print jobs are randomly lined. According to the third embodiment, after the alert notification, computer 500 itself ends the "alert" display after a predetermined time without waiting for a user's click on a button to close the dialog box display. This reduces a part of user's troublesome operations, as with the first and second embodiments. Thus, since frequent printer alert notifications are not executed and an alert notification ending process is executed by computer 500 itself, the usability of computer 500 improves.

Predetermined time period Ts can be defined as a period of time from the time when a previous alert information dialog box is displayed to the time when a subsequent alert information dialog box is displayed. Predetermined time period Ts can be defined as a period of time from the beginning of a (prior) print job during which the previous alert information dialog box is displayed to the beginning of a (subsequent) print job during which the next alert information dialog box is displayed. Further, predetermined time period Ts can be defined as a period of time starting at the time when the previous alert information display is ended. Predetermined time period Ts can be applicable to any other arbitrary processing times corresponding to two print jobs.

According to the above-described embodiments, although a printer has been explained as an image forming apparatus, it is applicable to a facsimile, an MFP (Multifunction Peripheral device), a copier and the like, as an image forming apparatus. Apparatus conditions of an image forming apparatus include conditions of the apparatus itself and conditions of consumable supplies, namely a loosened belt condition, toner level, lifetime of a fixing heater, remaining paper quantity, a paper jam condition and the like; however those conditions may be categorized more specifically.

What is claimed is:

1. An image processor operable with an image forming apparatus comprising:
   an apparatus condition information acquisition unit configured to receive apparatus condition information from the image forming apparatus when the image processor instructs the image forming apparatus to print;
   a notification control unit configured, when the apparatus condition information acquisition unit receives apparatus condition information that requires an alert, to notify alert information corresponding to the alert using a notification unit;
   a time period storage unit storing a time period;
   a storage unit configured to store first information related to alert information previously notified using the notification unit and second information related to current apparatus condition that requires an alert; and
   a judgment unit configured to judge whether the first information and the second information match,
   wherein the notification control unit is configured to not notify alert information related to the current apparatus condition that requires an alert using the notification unit when an elapsed time from the notification of the previous alert information to the reception of the current apparatus condition information that requires an alert is equal to or less than the time period stored in the time period storage unit and the first information and the second information match.

2. The image processor of claim 1, further comprising a time period setting unit configured to register the time period, which is input by a user, to the time period storage unit.

3. The image processor of claim 2, further comprising a print job judgment unit configured to judge whether a current print job to be requested to the image forming apparatus to print is a serial print job related to a previous print job previously requested to the image forming apparatus, wherein, when the print job judgment unit judges that the current print job is the serial print job related to the previous print job, the judgment unit is configured to not instruct the notification control unit to notify the alert information.

4. The image processor of claim 1, further comprising a print job judgment unit configured to judge whether a current print job to be requested to the image forming apparatus to print is a serial print job related to a previous print job previously requested to the image forming apparatus, wherein, when the print job judgment unit judges that the current print job is the serial print job related to the previous print job, the judgment unit is configured to not instruct the notification control unit to notify the alert information.

5. An image processor operable with an image forming apparatus comprising:

an apparatus condition information acquisition unit configured to receive apparatus condition information from the image forming apparatus when the image processor instructs the image forming apparatus to print, a notification control unit configured, when the apparatus condition information acquisition unit receives an apparatus condition information that requires an alert, to notify alert information corresponding to the alert using a notification unit;

a time period storage unit storing a time period;

a storage unit configured to store first information related to alert information previously notified using the notification unit and second information related to current apparatus condition that requires an alert; and a judgment unit configured to judge whether the first information and the second information match, wherein the notification control unit is configured to notify alert information related to the current apparatus condition that requires an alert using the notification unit when an elapsed time from the notification of the previous alert information to the reception of the current apparatus condition information that requires an alert is greater than the time period stored in the time period storage unit or when the first information and the second information do not match.

6. The image processor of claim 5, further comprising a time period setting unit configured to register the time period, which is input by a user, to the time period storage unit.

7. The image processor of claim 6, further comprising a print job judgment unit configured to judge whether a current print job to be requested to the image forming apparatus to print is a serial print job related to a previous print job previously requested to the image forming apparatus, wherein, when the print job judgment unit judges that the current print job is the serial print job related to the previous print job, the judgment unit is configured to not instruct the notification control unit to notify the alert information.

8. The image processor of claim 5, further comprising a print job judgment unit configured to judge whether a current print job to be requested to the image forming apparatus to print is a serial print job related to a previous print job previously requested to the image forming apparatus, wherein, when the print job judgment unit judges that the current print job is the serial print job related to the previous print job, the judgment unit is configured to not instruct the notification control unit to notify the alert information.

* * * * *